(12) United States Patent
Sollitt

(10) Patent No.: US 11,576,360 B2
(45) Date of Patent: Feb. 14, 2023

(54) DODGER AND OTHER FISH ATTRACTANT SPREADER DEVICE FOR USE WHILE TROLLING

(71) Applicant: Glenn Ralston Sollitt, Qualicum Beach (CA)

(72) Inventor: Glenn Ralston Sollitt, Qualicum Beach (CA)

( * ) Notice: Subject to any disclaimer, the term of this patent is extended or adjusted under 35 U.S.C. 154(b) by 27 days.

(21) Appl. No.: 17/175,399

(22) Filed: Feb. 12, 2021

(65) Prior Publication Data
US 2021/0259229 A1    Aug. 26, 2021

Related U.S. Application Data

(60) Provisional application No. 62/979,179, filed on Feb. 20, 2020.

(51) Int. Cl.
*A01K 91/08*    (2006.01)
*A01K 91/053*   (2006.01)

(52) U.S. Cl.
CPC ............ *A01K 91/08* (2013.01); *A01K 91/053* (2013.01)

(58) Field of Classification Search
CPC ...... A01K 91/08; A01K 91/053; A01K 91/03; A01K 91/065
USPC .................................. 43/42.74, 43.1, 43.15
See application file for complete search history.

(56) References Cited

U.S. PATENT DOCUMENTS

| | | | | |
|---|---|---|---|---|
| 2,157,003 A | * | 5/1939 | Mussina ................ | A01K 93/00 43/42.74 |
| 2,289,663 A | * | 7/1942 | Linhares ................ | A01K 93/00 43/43.15 |
| 2,742,730 A | * | 4/1956 | Karr ..................... | A01K 91/053 43/42.74 |
| 2,763,954 A | * | 9/1956 | Bunker .................. | A01K 85/01 446/419 |
| 2,780,023 A | * | 2/1957 | Mercier ................. | A01K 95/00 43/42.74 |
| 2,848,835 A | * | 8/1958 | Witt ....................... | A01K 95/00 43/43.15 |
| 2,930,159 A | * | 3/1960 | Culhane ............... | A01K 91/053 446/236 |
| 3,190,029 A | * | 6/1965 | Bondi .................. | A01K 91/053 43/42.74 |
| 3,550,305 A | * | 12/1970 | Santosuosso ........ | A01K 91/053 43/42.74 |

(Continued)

*Primary Examiner* — Christopher P Ellis
(74) *Attorney, Agent, or Firm* — ATMAC Patent Services Ltd.; Andrew T. MacMillan

(57) ABSTRACT

A fish attractant spreader device includes a center bar running lengthwise from a back end to a front end and a spreader bar attached to the center bar and extending lengthwise non-parallel with the center bar. The device includes a front line attachment at the front of the center bar, a back line attachment at the back of the center bar, and at least one fish attractant attachment on the spreader bar. A fish attractant such as a dodger or flasher may be attached to the attractant attachment on the spreader bar. A release clip may be attached to the back line attachment of the center bar for providing temporary attachment to a fishing line and a downrigger stacker clip may be connected to the front line attachment of the center bar for attachment to a downrigger line. The spreader bar and the center bar may form a cross shape.

20 Claims, 18 Drawing Sheets

(56) References Cited

U.S. PATENT DOCUMENTS

| | | | | |
|---|---|---|---|---|
| 3,646,700 | A * | 3/1972 | Pond | A01K 91/053 43/42.74 |
| 3,703,047 | A * | 11/1972 | Schenavar | A01K 91/053 43/44.84 |
| 3,878,636 | A * | 4/1975 | George | A01K 91/053 43/43.11 |
| 3,991,505 | A * | 11/1976 | Simeti | A01K 91/053 43/43.12 |
| 4,201,008 | A * | 5/1980 | Sparkman | A01K 85/00 D22/128 |
| 4,793,091 | A * | 12/1988 | Cerny | A01K 91/00 43/43.15 |
| 4,893,432 | A * | 1/1990 | Rosengrant | A01K 91/053 43/42.74 |
| 4,920,687 | A * | 5/1990 | Barnett | A01K 91/053 43/42.74 |
| 4,998,374 | A * | 3/1991 | Barnett | A01K 91/08 43/42.74 |
| 5,009,025 | A * | 4/1991 | Austad | A01K 91/03 43/44.83 |
| 5,076,006 | A * | 12/1991 | Kahng | A01K 91/03 43/43.12 |
| D364,444 | S * | 11/1995 | DeCosta | D22/129 |
| 5,771,625 | A * | 6/1998 | Savaglia | A01K 91/053 43/44.84 |
| 6,000,166 | A * | 12/1999 | Kirkpatrick | A01K 91/06 43/42.74 |
| 6,618,980 | B1 * | 9/2003 | De Boer, Jr. | A01K 91/053 43/43.15 |
| 8,033,044 | B2 * | 10/2011 | Hails | A01K 91/10 43/43.15 |
| 8,347,547 | B1 * | 1/2013 | Houdek | A01K 91/065 43/42.11 |
| 8,572,887 | B2 * | 11/2013 | Adelman | A01K 97/02 43/42.74 |
| 2002/0152670 | A1 * | 10/2002 | Oleksak | A01K 91/053 43/42.74 |
| 2008/0040966 | A1 * | 2/2008 | Stone | A01K 91/053 43/43.15 |
| 2009/0139131 | A1 * | 6/2009 | Throssell | A01K 91/047 43/42.74 |
| 2016/0081318 | A1 * | 3/2016 | Rothan | A01K 91/047 43/44.9 |
| 2016/0165868 | A1 * | 6/2016 | LeHew | A01K 85/00 43/42.74 |
| 2016/0360739 | A1 * | 12/2016 | Adelman | A01K 91/053 |

\* cited by examiner

FIG. 1 – Prior art

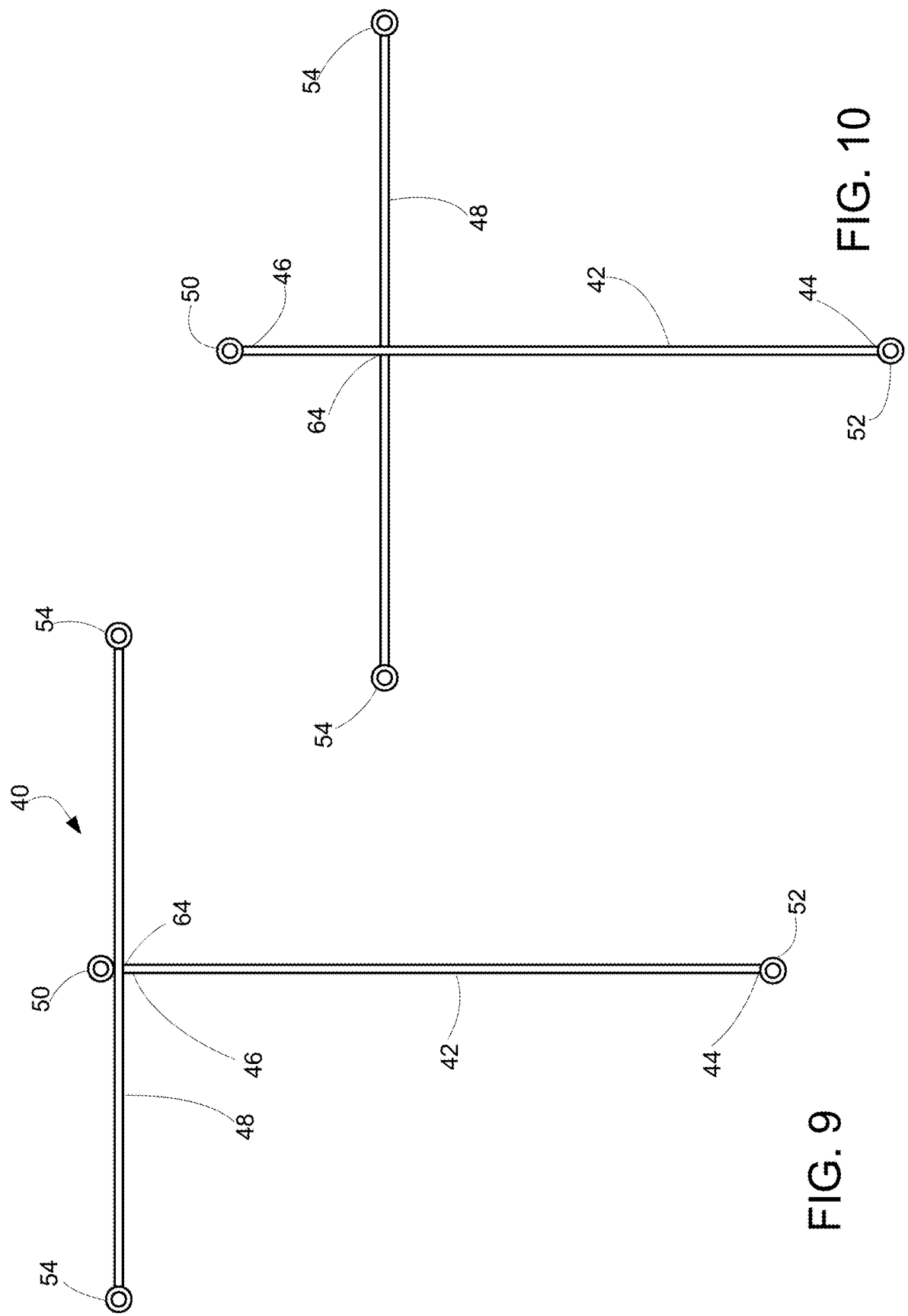

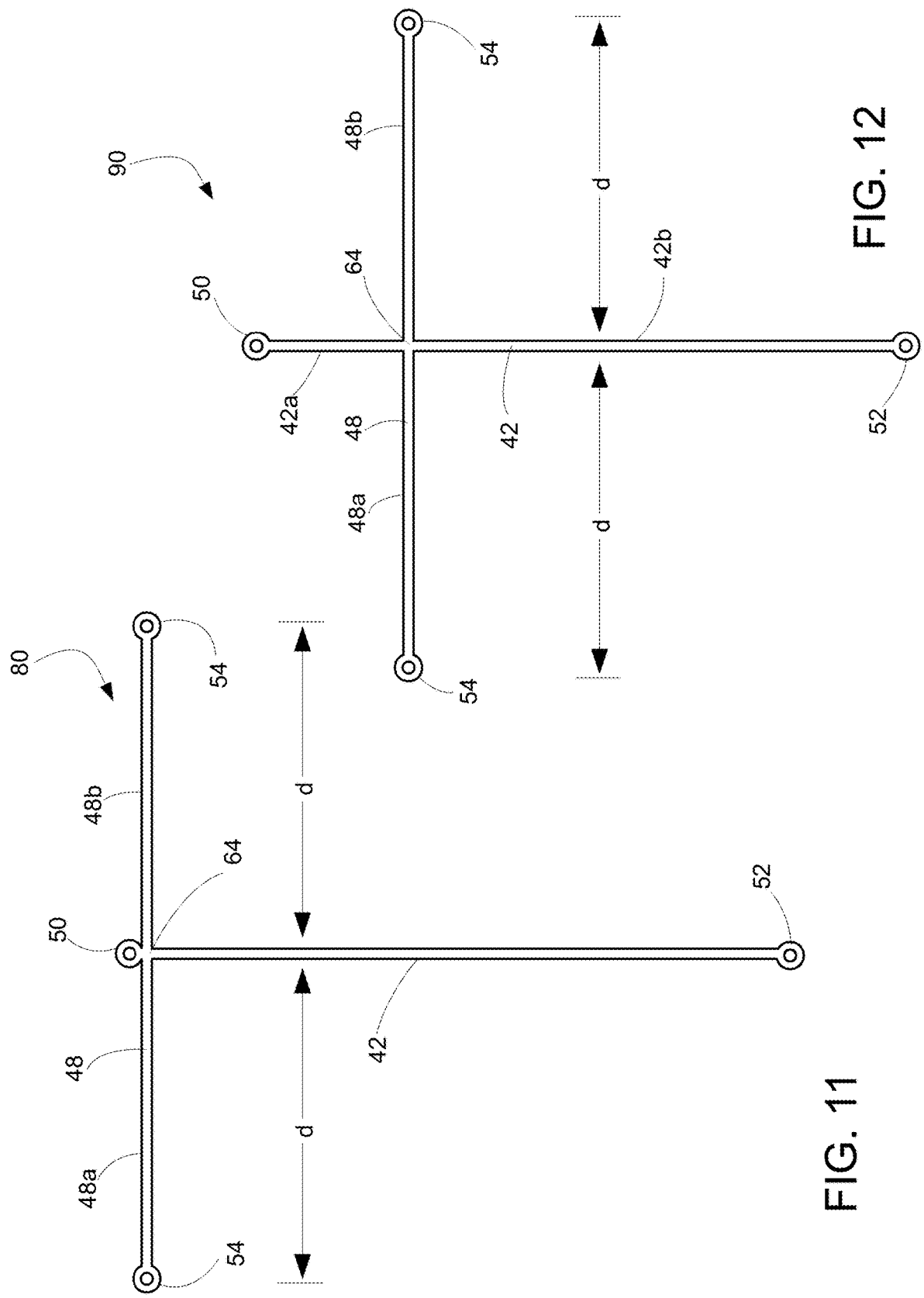

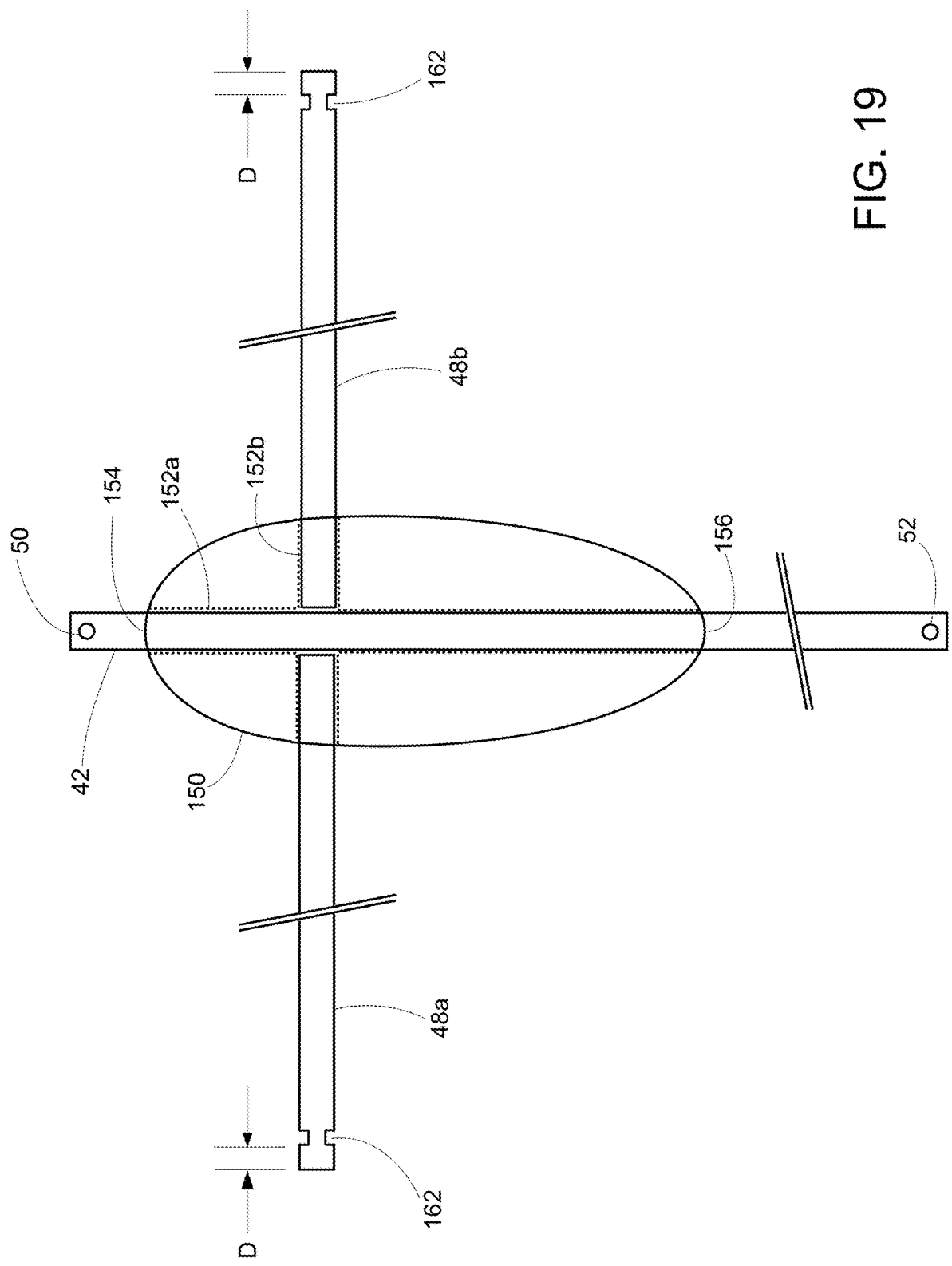

DODGER AND OTHER FISH ATTRACTANT SPREADER DEVICE FOR USE WHILE TROLLING

CROSS-REFERENCE TO RELATED APPLICATIONS

This application claims the benefit of priority of U.S. Provisional Application No. 62/979,179 filed Feb. 20, 2020, which is incorporated herein by reference.

BACKGROUND OF THE INVENTION

(1) Field of the Invention

The invention pertains generally to fishing equipment. More specifically, the invention relates to a spreader device for providing and spreading out a plurality of fish attractants such as dodgers in front of a lure on a fishing line while trolling.

(2) Description of the Related Art

FIG. 1 illustrates a dummy dodger line 10 rigged below a fishing line 12 according to the related art. As illustrated, a downrigger ball 14 is coupled to a downrigger line 16. The fishing line 12 is temporarily attached to the downrigger line 16 via a stacker clip 18 and a line release clip 20. There could be a first attractant such as a flasher or dodger 22 coupled in-line to the fishing line 12 upstream of the lure 24 (with hook 26). Because the dodger 22 on the fishing line 12 may not be sufficient to attract fish to the lure 24, the dummy dodger line 10 is provided coming off the side of the downrigger ball 14. A plurality of additional dodgers 22 are coupled to the dummy dodger line 10 to further attract fish to the lure 24.

The line release clip 20 is a tension gripping release clip that holds the fishing line 12 secure until a predetermined threshold of pulling force is applied to the fishing line 12 thereby overcoming the friction fit of the release clip 20. The fishing line 12 is therefore released from the downrigger line 16 and can be reeled up to retrieve the fish.

There are a number of problems with the above-described rigging. For one, the dummy dodger line 10 must be spaced far enough away from the fishing line 12 in order to avoid tangling. Typically ten to twelve feet minimum distance L between the fishing line 12 and the dummy dodger line 10 is required. More separation space L is better from the point of view of tangle prevention; however, the further the dummy dodger line 10 is from the lure 24 the less effective the attractive benefit of the dodgers 22 on the dummy line 10 are at guiding fish to the lure 24.

To help overcome this problem and ensure there is at least one dodger 22 that is in close proximity to the lure 24, a dodger 22 is typically connected in-line on the fishing line 12 itself preceding the lure 24. However, providing a dodger 22 in series on the fishing line 12 makes it more difficult to reel in a fish because the dodger 22 on the fishing line 12 increase drag and may in certain cases assist the fish to escape the line 12.

BRIEF SUMMARY OF THE INVENTION

An exemplary objective of some embodiments of the invention is to provide a device for providing and spreading out one or more dodgers in front of a lure on a fishing line without the dodgers actually being connected to the fishing line.

According to an exemplary embodiment of the invention, disclosed is a fish attractant spreader device that includes a center bar that runs lengthwise from a back end to a front end and a spreader bar attached to the center bar and extending lengthwise non-parallel with the center bar from a first end to a second end. The device further includes a front eyelet at the front end of the center bar, a back eyelet at the back end of the center bar, and at least one eyelet on the spreader bar. A fish attractant such as a dodger or flasher may be attached to the eyelet on the spreader bar. A release clip may be attached to the back eyelet of the center bar for providing temporary attachment to a fishing line and a downrigger stacker clip may be connected to the front eyelet of the center bar for attachment to a downrigger line.

According to an exemplary embodiment of the invention, disclosed is a fish attractant spreader device that includes a center bar running lengthwise from a back end to a front end and a spreader bar attached to the center bar and extending lengthwise non-parallel with the center bar. The device includes a front line attachment at the front of the center bar, a back line attachment at the back of the center bar, and at least one fish attractant attachment on the spreader bar. A fish attractant such as a dodger or flasher may be attached to the attractant attachment on the spreader bar. A release clip may be attached to the back line attachment of the center bar for providing temporary attachment to a fishing line and a downrigger stacker clip may be connected to the front line attachment of the center bar for attachment to a downrigger line. The spreader bar and the center bar may form a cross shape and may be attached together utilizing a connection hub.

The fish attractant attachment may be eyelet or may be a ringed notch that runs around a cylindrical portion of the spreader bar near but not at an end of the spreader bar. A fish attractant may be attached to the ringed notch by two interlocking rings: a first ring that slips around the spreader bar and enters the ringed notch and a second ring that interlocks with the first ring while the first ring is in the notch and thereby prevents the first ring from leaving the notch.

According to an exemplary embodiment of the invention, disclosed is a spreader device including a center bar that runs lengthwise from a back end to a front end, and a spreader bar coupled to the front end of the center bar thereby forming a T-shape (uppercase or lowercase/cross) between the two bars. The spreader bar has a dodger or other fish attractant attached at each end. The center bar further has a downrigger clip connected at the front end and a release clip coupled at the rear end.

Exemplary advantages in some embodiments include, when a fish strikes and pulls the fishing line out of the release clip, the entire spreader device with associated dodgers and other accessories attached thereto remains connected to the downrigger line and the fisher is left to reel in only the fish on the fishing line, without the drag or encumbrance resulting from an in-line flasher/dodger. Reel-in is thus easier, more reliable and much more enjoyable.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 9 illustrates a top view of fish attractant spreader device formed with separate rods without attached accessories and having an uppercase "T" shape according to an exemplary embodiment.

FIG. 10 illustrates a top view of a fish attractant spreader device formed with separate rods without attached accessories and having a lowercase "t" shape according to an exemplary embodiment.

FIG. 11 illustrates a top view of fish attractant spreader device formed with integral rods without attached accessories and having an uppercase "T" shape according to an exemplary embodiment.

FIG. 12 illustrates a top view of a fish attractant spreader device formed with integral rods without attached accessories and having a lowercase "t" shape according to an exemplary embodiment.

FIG. 19 illustrates a top view of a fish attractant spreader device including the connection hub of FIG. 17 according to an exemplary embodiment.

DETAILED DESCRIPTION

Figure 1:
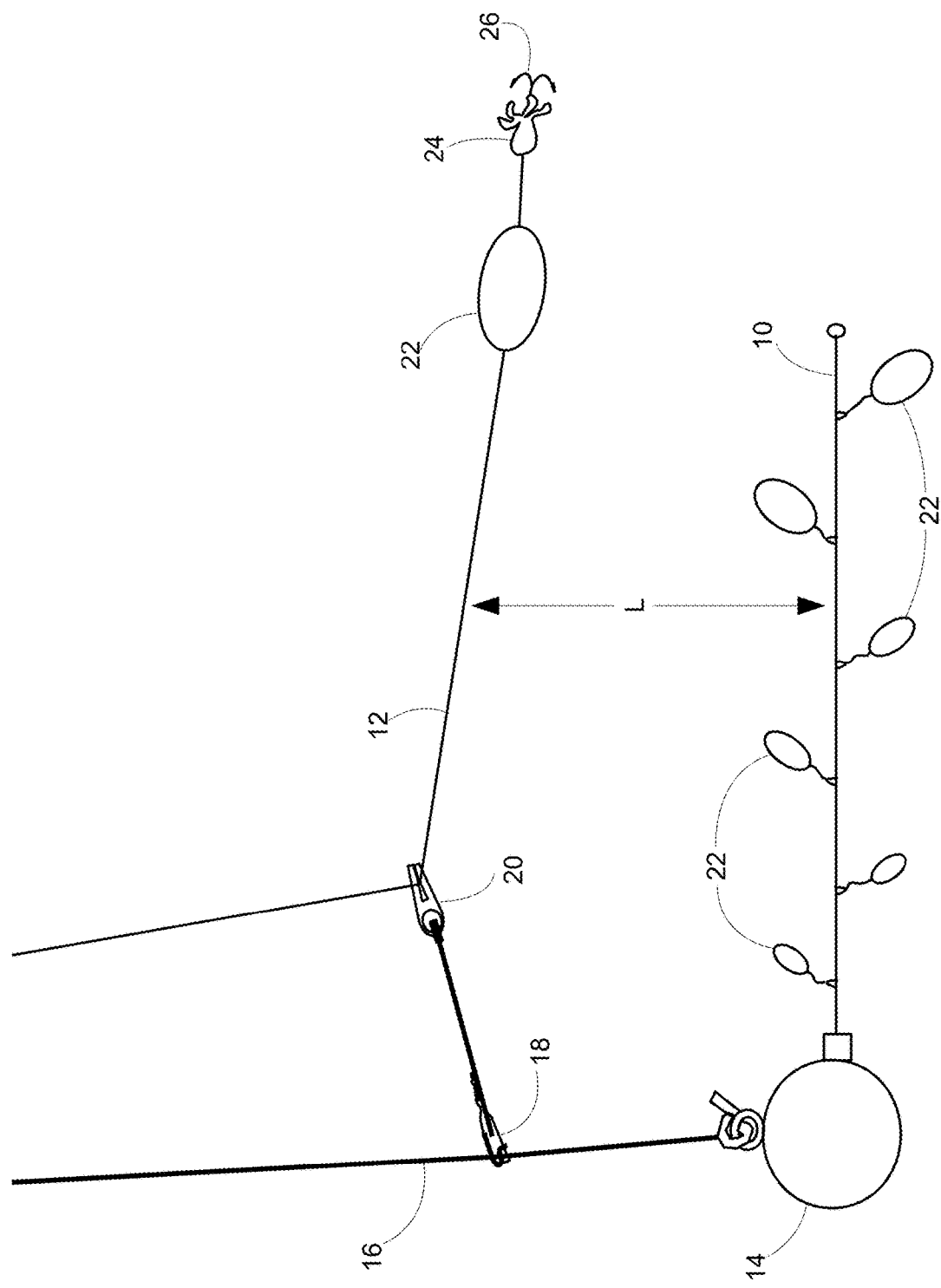
FIG. 1 illustrates a dummy dodger line rigged below a fishing line according to the related art.
Figure 2:
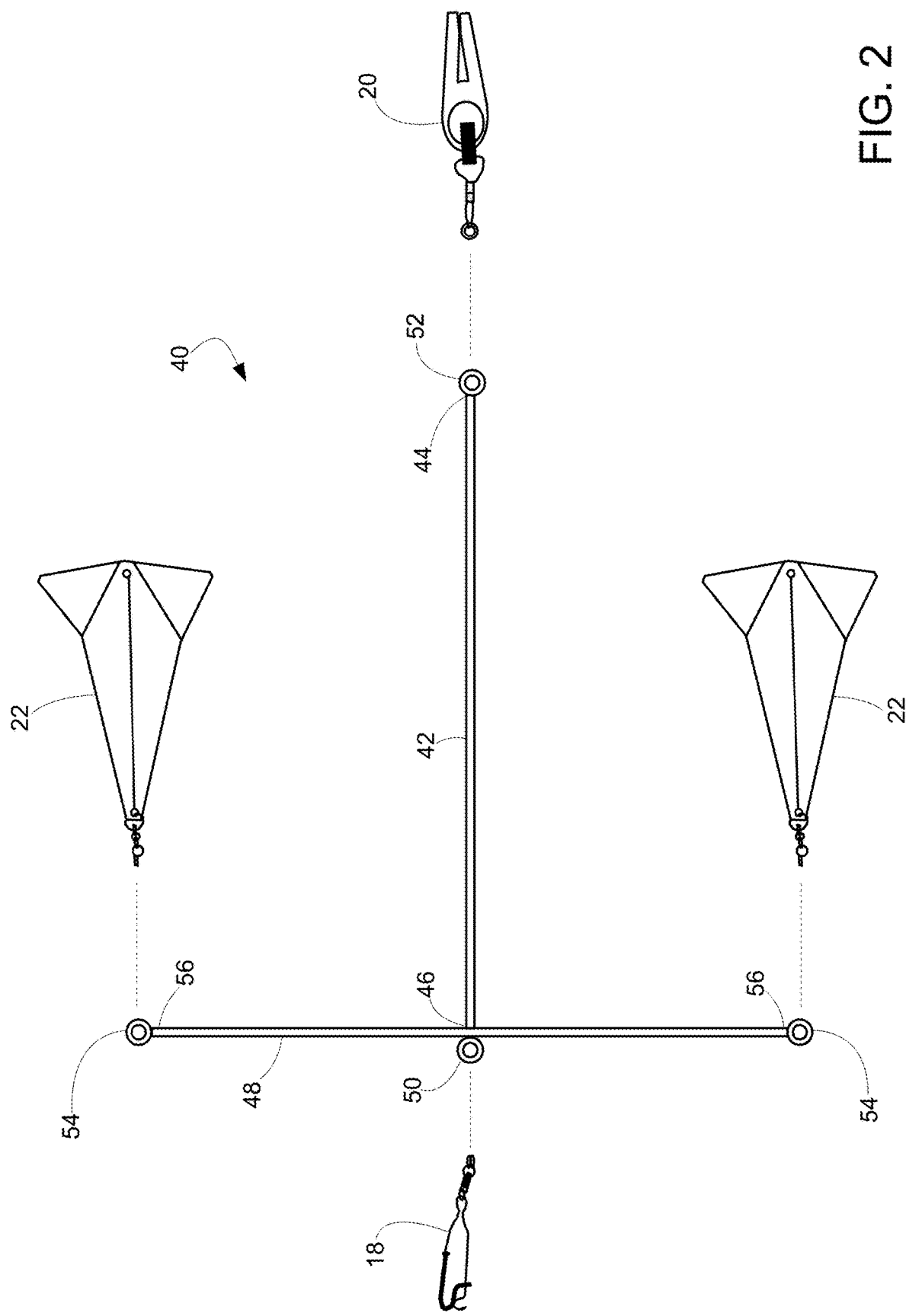
FIG. 2 shows an exploded top-view of a fish attractant spreader device according to an exemplary embodiment.

FIG. 2 shows an exploded top-view of a fish attractant spreader device 40 according to an exemplary embodiment. The spreader device 40 includes a center bar 42 that runs lengthwise from a back end 44 to a front end 46, and a spreader bar 48 is coupled to the front end 46 of the center bar 42 thereby forming a uppercase T-shape between the two bars 42, 48. A front eyelet 50 is provided at the front end 46 of the center bar 42, a back eyelet 52 is provided at the back end 44 of the center bar 42, and side eyelets 54 are provided on each end 56 of the spreader bar 48. The spreader bar 48 has a respective dodger 22 attached at each of the first and second ends 54 of the spreader bar 48. The center bar 42 further has a downrigger stacker clip 18 connected at the front end 46 and a line release clip 20 coupled at the back end 44.

Figure 3:
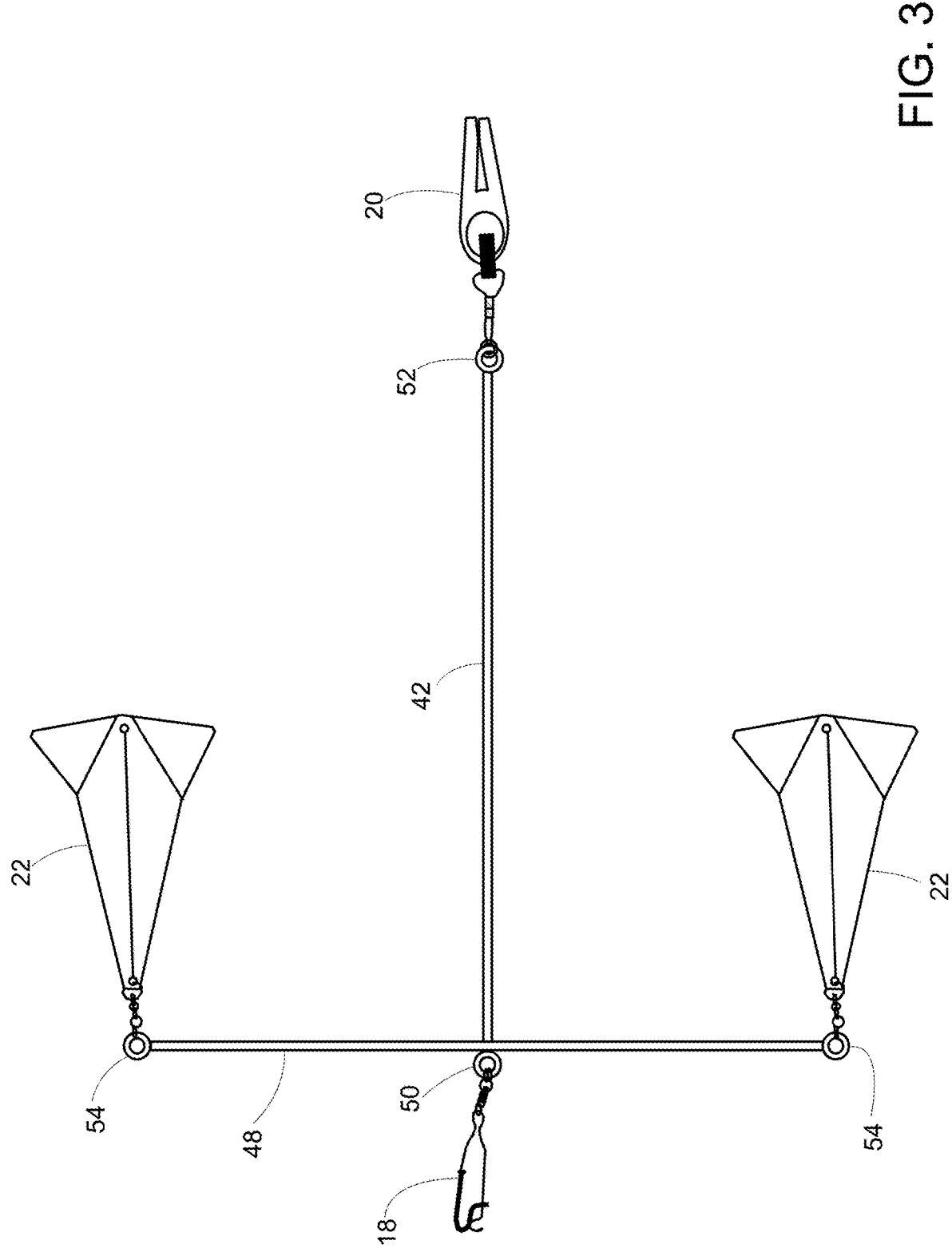
FIG. 3 shows a top-view of the fish attractant spreader device of FIG. 2 in an assembled state according to an exemplary embodiment.

FIG. 3 shows a top-view of the fish attractant spreader device 40 of FIG. 2 in an assembled state according to an exemplary embodiment. As illustrated, each end 44, 46 of the center bar 42 and each end 56 of the spreader bar 48 in this embodiment includes an eyelet 52, 50, 54 implemented by rings attached to the ends of the bars 42, 48 to facilitate rigging the dodgers 22, release clip 20 and downrigger clip 18 thereto. Swivels such as one or more ball bearings may be utilized as known in the art at each of these eyelet 50, 52, 54 connection points to help prevent tangling.

Figure 4:
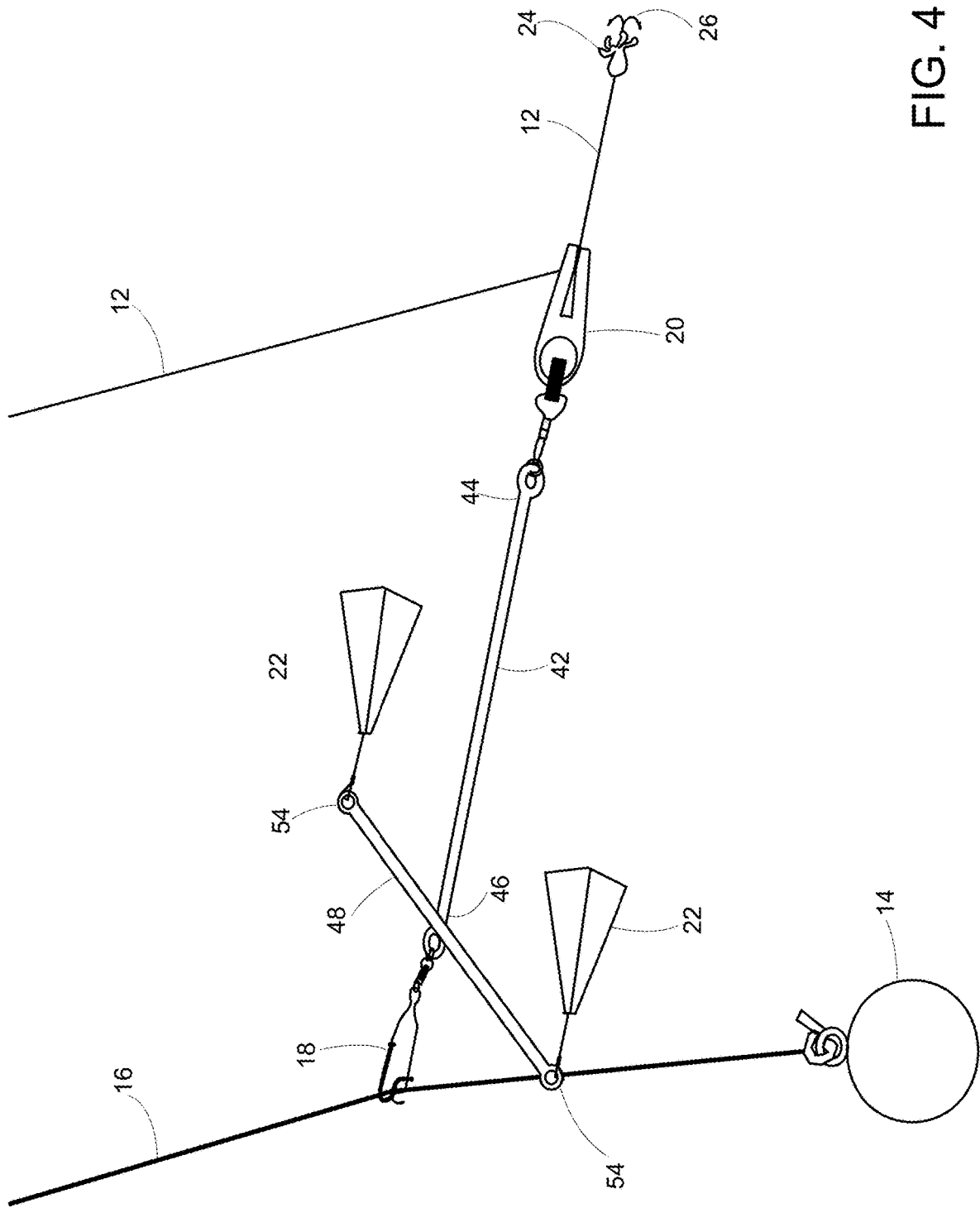
FIG. 4 illustrates a perspective view of usage of the spreader device of FIGS. 2 and 3 for trolling while coupled to a downrigger line and fishing line prior to fish strike according to an exemplary embodiment.

FIG. 4 illustrates a perspective view of usage of the spreader device 40 of FIGS. 2 and 3 for trolling while coupled to a downrigger line 16 and fishing line 12 prior to fish strike according to an exemplary embodiment. As shown, the front end 46 of the spreader device 40 is attached to the downrigger line 16 such as via the downrigger clip 18. The fishing line 12 is temporarily secured in the release clip 20 and the fishing line 12 only includes the lure 24 and hook 26. Beneficially, there are no dodgers 22 in-series with the fishing line 12 in the embodiment of FIG. 4 and the spreader device 40 ensures that the two dodgers 22 provided on the spreader bar 48 are directly preceding the lure 24 in close proximity.

Figure 5:
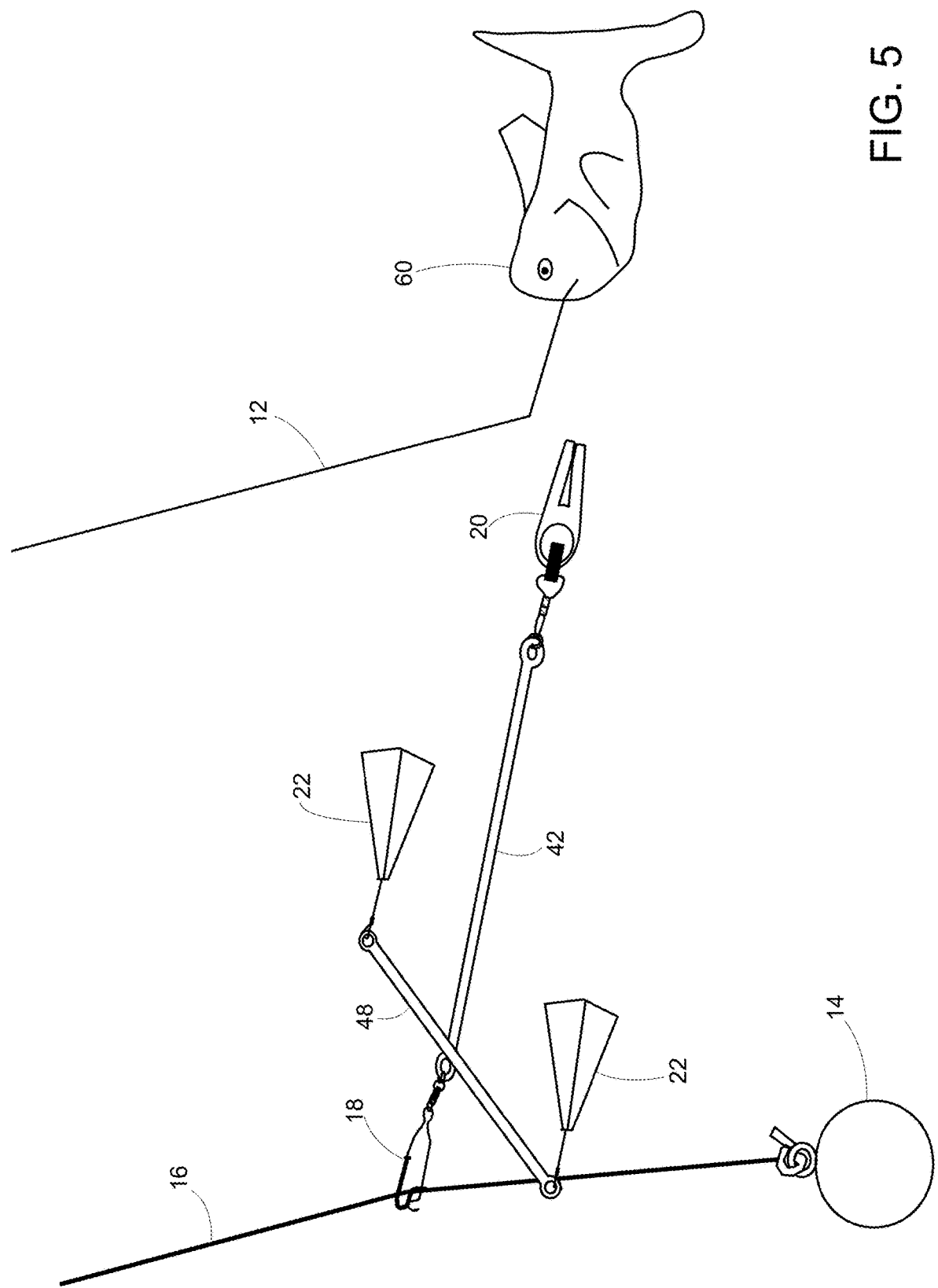
FIG. 5 illustrates a perspective view of usage of the spreader device of FIGS. 2 and 3 after a fish strike according to an exemplary embodiment.

FIG. 5 illustrates a perspective view of usage of the spreader device 40 of FIGS. 2 and 3 after a fish strike according to an exemplary embodiment. As illustrated, after the fish 60 has bitten the lure 24, the force applied to the fishing line 12 by the fish 60 exceeds the grip of the release clip 20 and the fishing line 12 separates from the spreader device 40 that remains still attached to the downrigger line 16. Beneficially, the spreader device 40 and all dodgers 22 coupled thereto are not required to be pulled up along with the fish 60. The fish 60 can be reeled in without drag of any dodgers 22 coupled in-series with the fishing line 12. Drag is reduced and the fish 60 is secured to the fishing line 12 without other objects on the line that may tangle and/or damage the line 12. Likewise, in the event of a fishing line 12 break, the spreader device 40 and dodgers 22 attached thereto are not lost.

Figure 6:
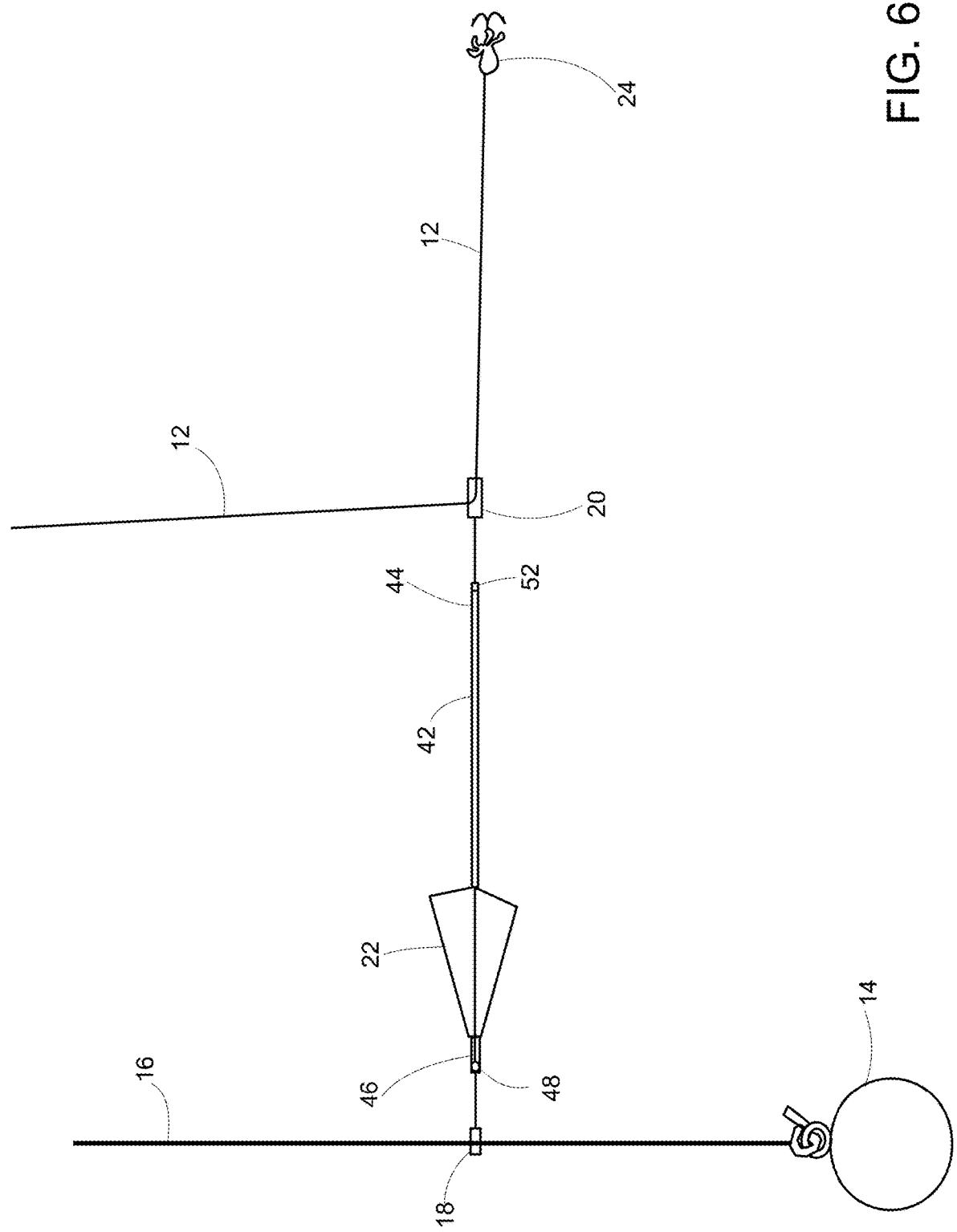
FIG. 6 illustrates a side view of the spreader device of FIGS. 2 and 3 coupled to both the downrigger line and the fishing line prior to a fish striking the lure according to an exemplary embodiment.
Figure 7:
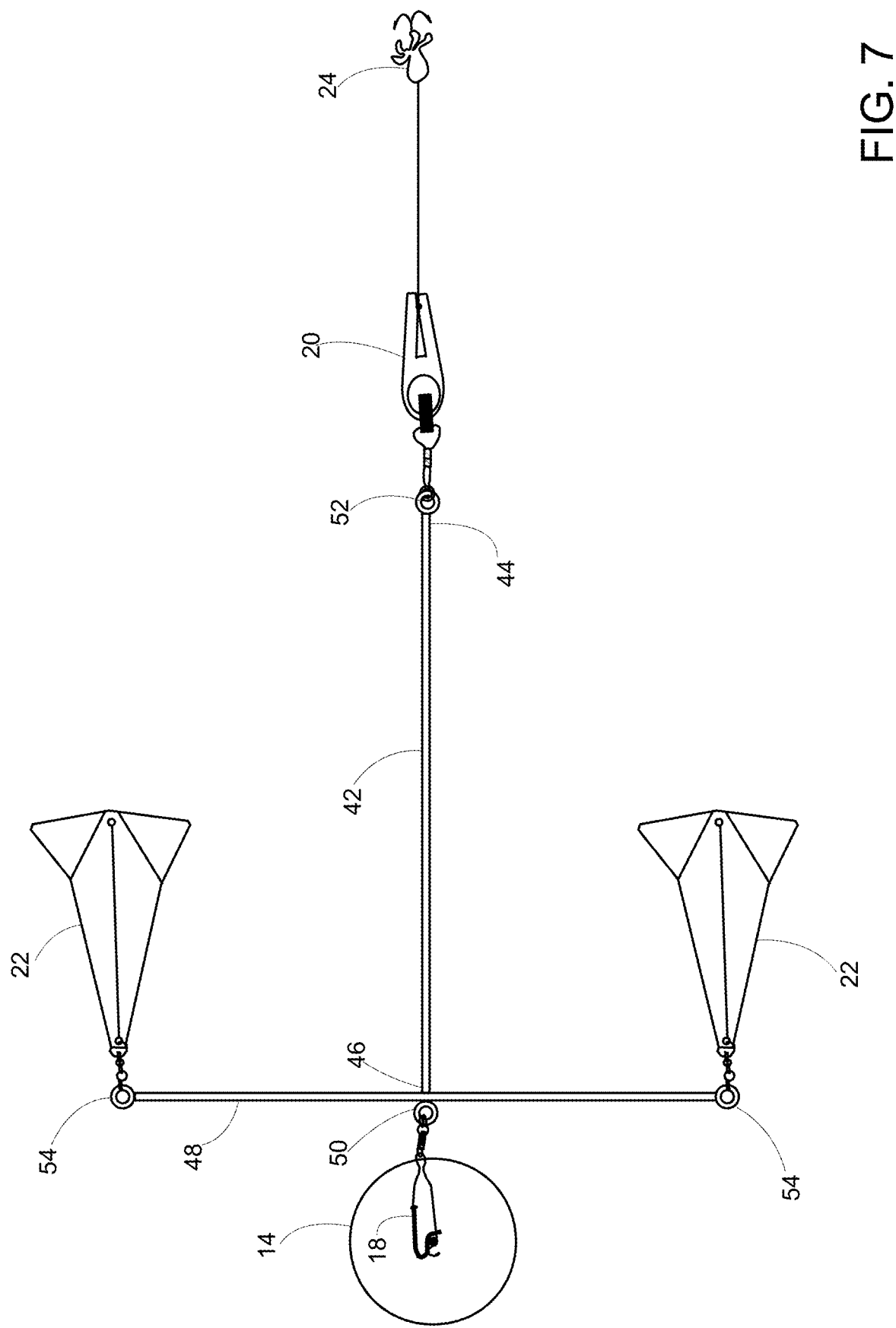
FIG. 7 illustrates a top view the spreader device coupled to both the downrigger line and the fishing line prior to the fish striking the lure as illustrated in FIG. 6.

FIG. 6 illustrates a side view of the spreader device 40 of FIGS. 2 and 3 coupled to both the downrigger line 16 and the fishing line 12 prior to a fish 60 striking the lure 24 according to an exemplary embodiment. Likewise, FIG. 7 illustrates a top view of the spreader device 40 coupled to both the downrigger line 16 and the fishing line 12 prior to the fish 60 striking the lure 24 as illustrated in FIG. 6.

Figure 8:
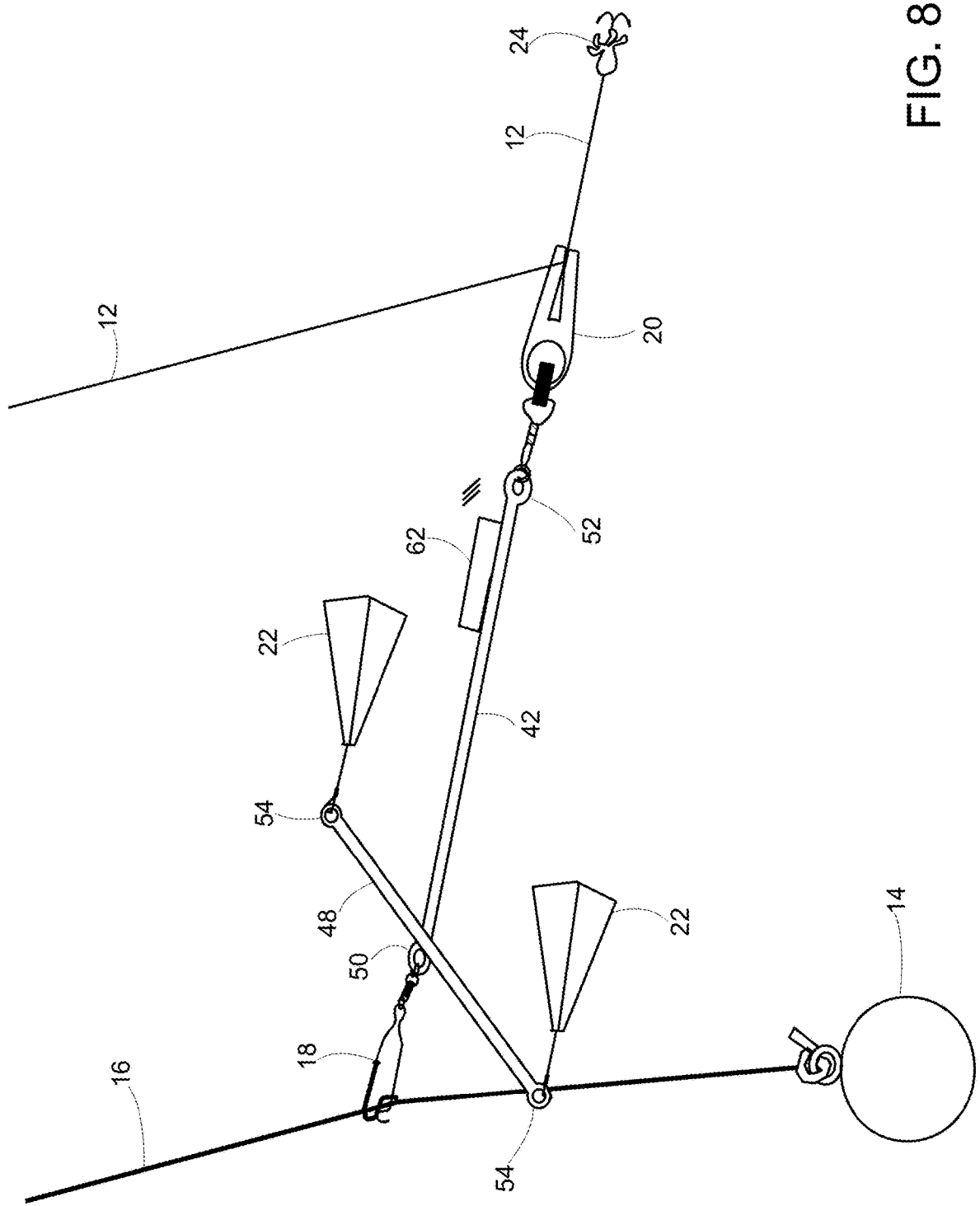
FIG. 8 illustrates a perspective view of a spreader device with integrated scent cartridge for trolling while coupled to a downrigger line and fishing line prior to fish strike according to an exemplary embodiment.

FIG. 8 illustrates a perspective view of a spreader device 40 with integrated scent cartridge 62 for trolling while coupled to a downrigger line 16 and fishing line 12 prior to fish strike according to an exemplary embodiment. The scent cartridge 62 is another type of fish attractant and is attached to the center bar 42 and provides additional attractant for fish immediately preceding the lure 24. As with the dodgers 22, the scent cartridge 62 is beneficially left behind after a fish strikes the lure 24 and the fishing line 12 is released from the line release clip 20. Other types of fish attractants such as cartridge holders and/or additional eyelets may also be coupled or otherwise disposed on the center bar and/or spreader bar in other embodiments.

FIG. 9 illustrates a top view of fish attractant spreader device 40 formed with separate rods without attached accessories and having an uppercase "T" shape according to an exemplary embodiment. As shown, the spreader device 40 of FIG. 9 generally corresponds to the above-illustrated embodiments including two bars: a center bar 42 and a spreader bar 48 permanently attached to one another at a connection point 64 adjacent to the front end 46 of the center bar 42 to form an uppercase T-shape. The two bars 42, 48 in this embodiment are separate stainless steel rods that are attached together perpendicular to each other during a manufacturing process involving welding the two bars 42, 48 together into the uppercase T-shape as illustrated. Ring eyelets 50, 52, 54 are also welded to each end 44, 46, 54 of the two bars 42, 48 thereby allowing a user to later attach various accessories.

In some embodiments, the fish attractant spreader device 40 is sold in the form illustrated in FIG. 9 without the dodgers 22, downrigger stacker clip 18 and line release clip 20. In some embodiments, the accessories including the dodgers 22, downrigger stacker clip 18 and line release clip 20 are separately provided and/or separately purchased by a user. In some embodiments, these accessories components 18, 20, 22 may beneficially be the exact same devices already known and available in the prior art. A user may selectively purchase and attach their preferred accessories 18, 20, 22 to the spreader device 40 via the various eyelets 50, 52, 54 provided on the spreader device 40. For example, different preferred dodgers 22 and line clips 18, 20 (both snap and release) may be utilized in conjunction with the spreader device 40 according to individual user preferences.

FIG. 10 illustrates a top view of a fish attractant spreader device 70 formed with separate rods without attached accessories and having a lowercase "t" shape according to an exemplary embodiment. Similar to the embodiment of FIG. 9, the spreader device of this embodiment is formed with two discrete bars 42, 48 that are permanently attached to one another at a point of connection 64 during manufacturer; however, in the embodiment of FIG. 10, the spreader bar 48 is attached lower down on the center bar 42 such that the bars 42, 48 together form a lowercase t-shape instead of an uppercase T-shape.

FIGS. 11 and 12 illustrate top views of spreader devices 80, 90 with integral center and spreader bars 42, 48 having uppercase T-shape and lowercase t-shape, respectively, according to further exemplary embodiments. The general shapes of the spreader devices 80, 90 in FIG. 11 and FIG. 12 are similar to those shown in FIGS. 9 and 10; however, whereas each of the bars 42, 48 and ring eyelets 50, 52, 54 were separate stainless steal components that were connected together in FIGS. 9 and 10, in FIGS. 11 and 12, these various components 42, 48, 50, 52, 54 are formed by an integral body. In particular, the center bar 42 and spreader bar 48 are integral to one another in each of the embodiments of FIGS. 11 and 12. Said differently, either or both of the center bar 42 and/or spreader bar 48 may be formed by one or more bar sections 42a, 42b, 48a, 48b. For instance, in FIG. 11, the center bar 42 as a whole is formed by a first bar section 42a that extends downward from a center point 64 of the spreader bar 48 running horizontally along the top. The spreader bar 48 in turn is formed by two spreader bar sections 48a, 48b extending away from the center point 64. Eyelets 50, 52, 54 are formed on the ends of the bars 42, 48 and the eyelets are rings of material integral to the bars 42, 48.

In FIG. 12, the spreader bar 48 is formed by left and right spreader bar sections 48a, 48b that extend from a connection point 64 laterally one each side of the center bar 42. Alternatively, the same design of FIG. 12 could also be described by saying the center bar 42 is formed by top and bottom center bar sections 42a, 42b that extend up and down from the connection point 64 on the top and bottom sides of the spreader bar 48.

In some embodiments such as those shown in FIGS. 9-12, the spreader bar 48 is centered across the center bar 42 such that each end and associated eyelet 54 of the spreader bar 48 extends laterally from the center bar 42 by a same distance d. Likewise, the spreader devices 80, 90 are symmetrical where the bars 42, 48 cross at perpendicular angles and are generally balanced along a center line running lengthwise up and down the center bar 42. Symmetric shape on either side of the center bar 42 helps in some embodiments to ensure the spreader device 80, 90 travels in a straight line while being pulled through the water from the eyelet 50 at the front end of the center bar 42.

Figure 13:
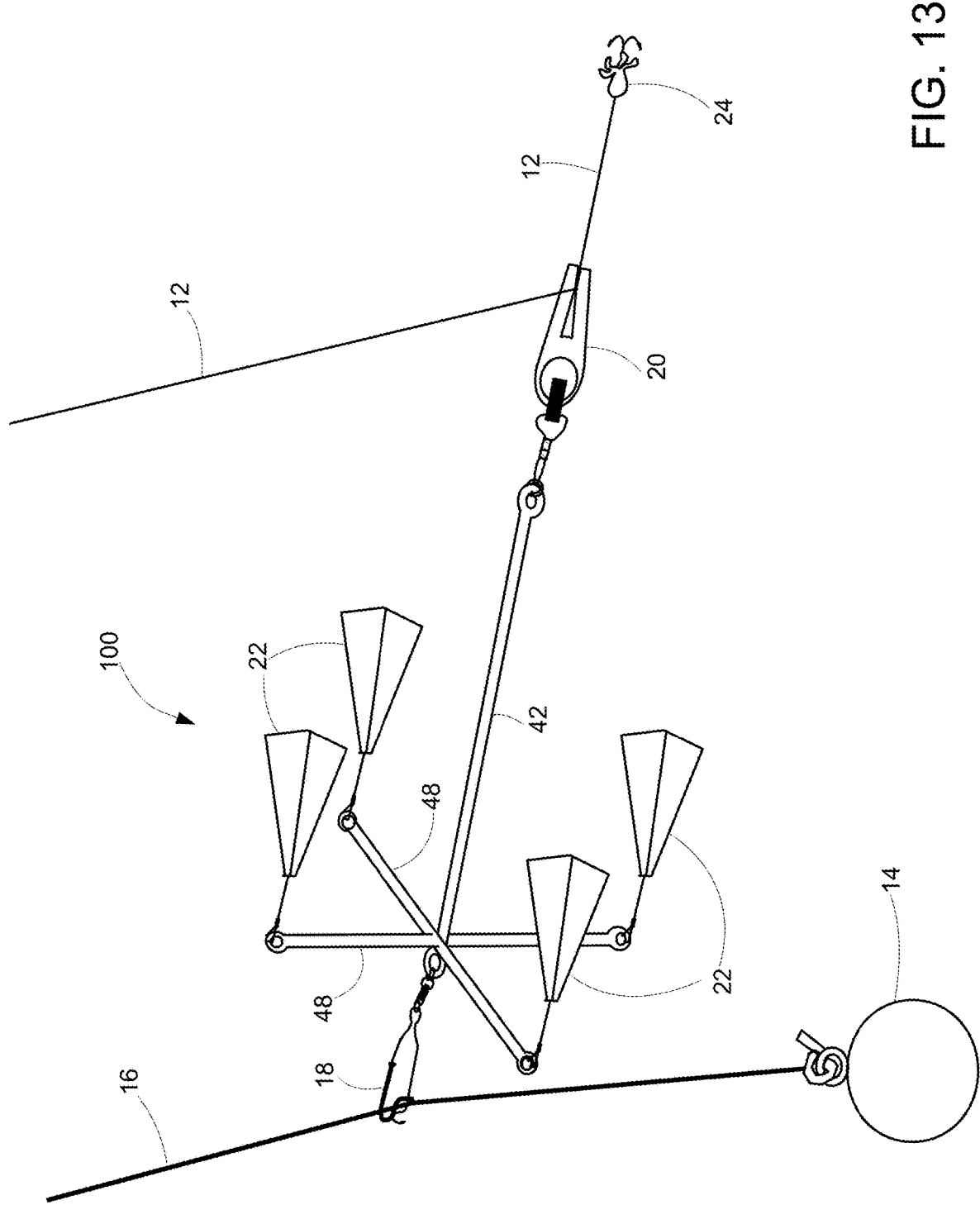
FIG. 13 illustrates a perspective view of a spreader device with a plurality of spreader bars coupled on the front end of the center bar.

Other shapes and variations on the spreader devices are also possible in different embodiments. For instance, FIG. 13 illustrates a perspective view of a spreader device 100 with a plurality of spreader bars 48 coupled on the front end 46 of the center bar 42. In this embodiment, both spreader bars 48 form an uppercase T-shape similar to as described above (see FIGS. 9 and 11 for example), but now there are two T-shapes in two respective planes that are perpendicular to one another. In this way, four dodgers 22 can be attached to the spreader 100 and there are dodgers 22 preceding the lure 24 both on the left and right sides of the lure 24 and also above and below the lure 24 as the spreader device 100 is pulled through the water. Of course, although an uppercase T-shape design is illustrated, spreader devices having two spreader bars 48 each forming a lowercase t-shape (such as illustrated in FIGS. 10 and 12) in a different plane with the center bar 42 are also possible in other embodiments.

Figure 14:
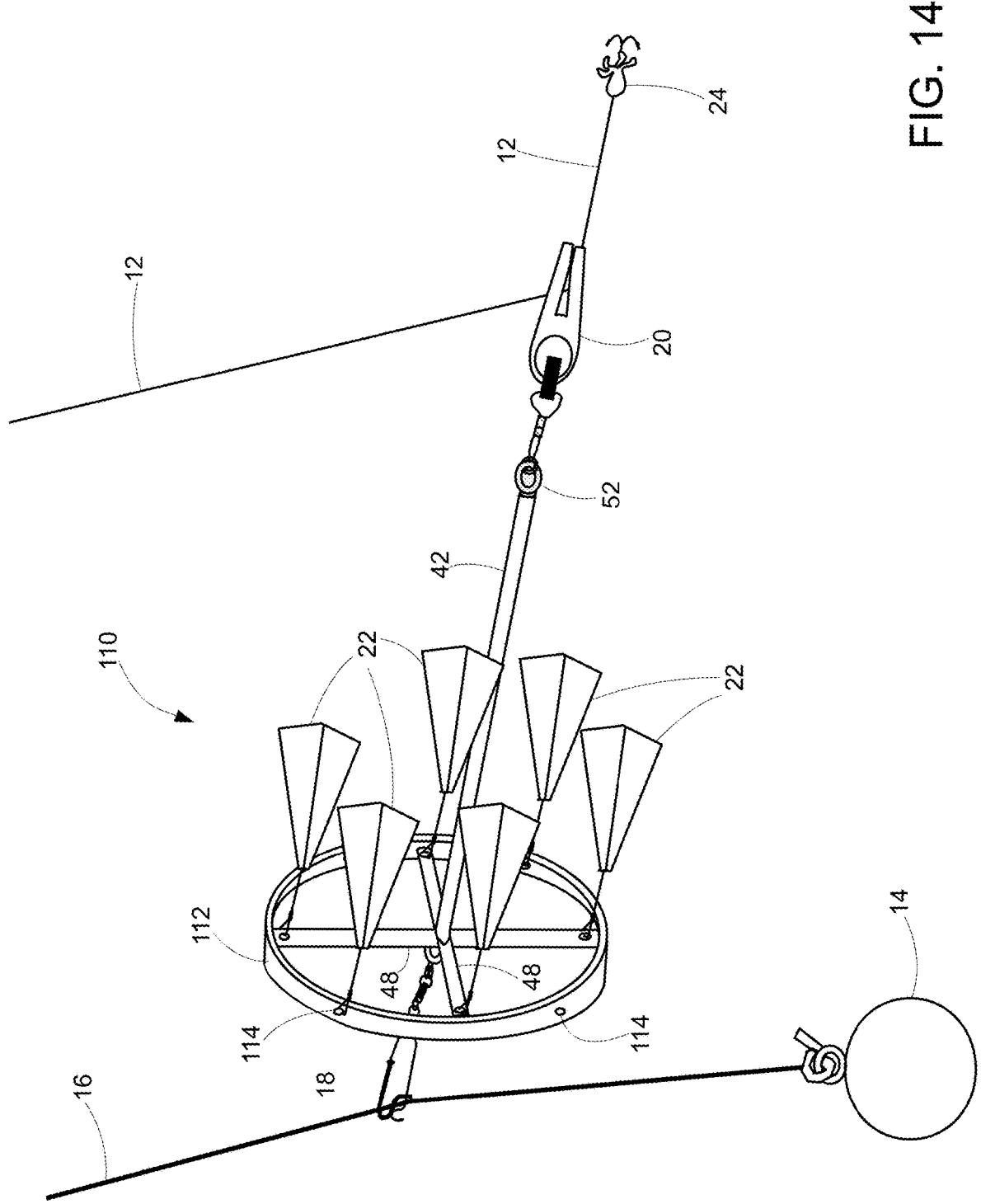
FIG. 14 illustrates a perspective view of a spreader device with a ring support structure wrapping around the ends of the two spreader bars thereby allowing any number of dodgers to be spread out in any desired pattern preceding the lure.

FIG. 14 illustrates a perspective view of a spreader device 110 with a ring support structure 112 wrapping around the ends of the two spreader bars 48 thereby allowing any number of dodgers 22 to be spread out in any desired pattern preceding the lure 24. The support structure 112 itself includes a plurality of eyelets 114 allowing attaching fish attractants such as dodgers 22 directly the support structure 112. For instance, the spreader device 110 with integrated ring support structure 112 as shown in FIG. 14 may be utilized to simulate a school of fish swimming in front of the lure 24.

Figures 15, 16:
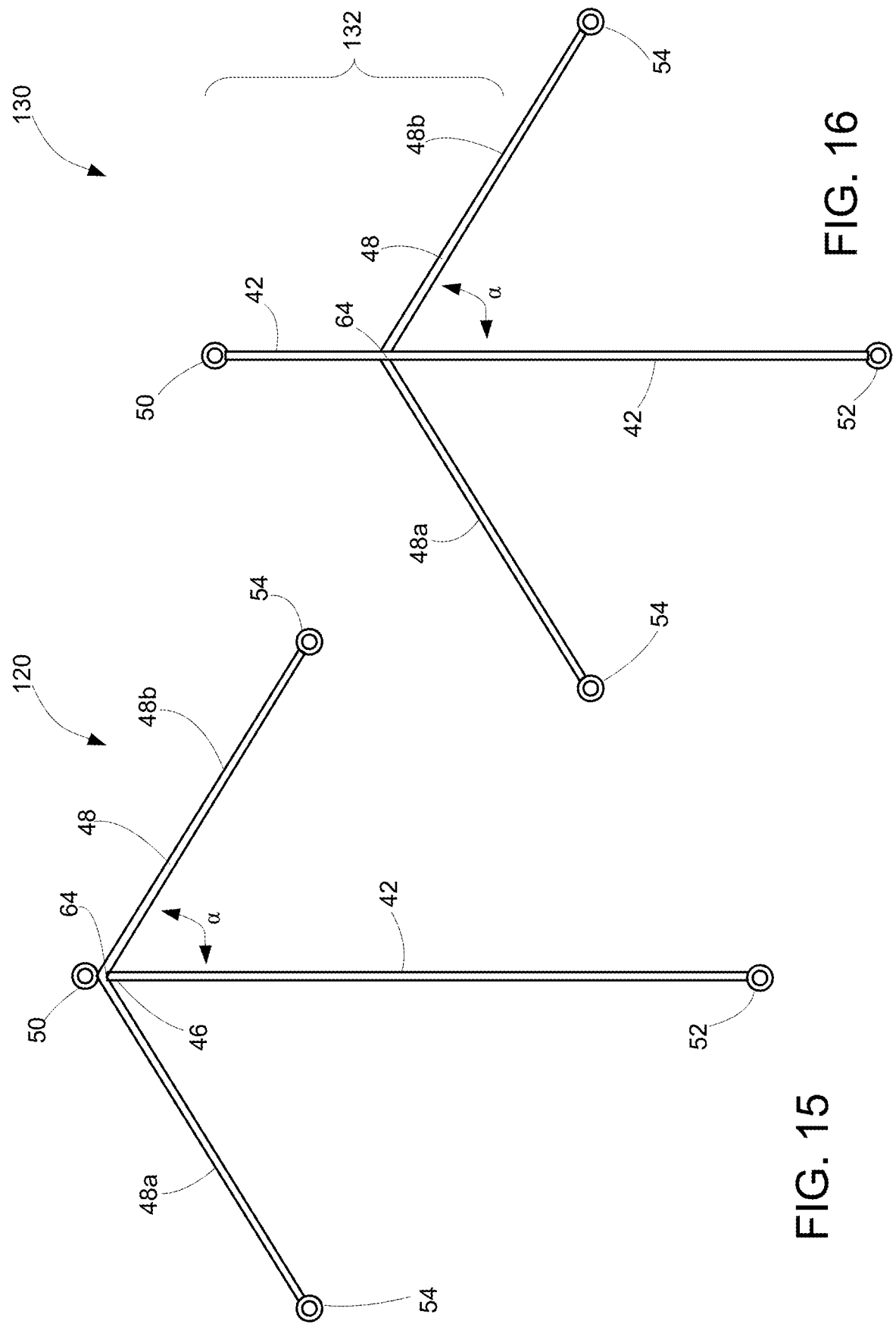
FIG. 15 illustrates a top view of a first inverse V-shaped spreader device with the spreader bar at the front end of the center bar according to an exemplary embodiment.
FIG. 16 illustrates a top view of a second inverse V-shaped spreader device with the spreader bar in a frontward section of the center bar according to an exemplary embodiment.

FIG. 15 and FIG. 16 illustrate additional examples of shapes of spreader devices 120, 130 is other embodiments. In particular rather than have the spreader bar sections 48a, 48b extend from side of the center bar 42 at ninety degree angles (perpendicular), in other embodiments, different angles are utilized. In general, the spreader bar(s) 48a, 48b may extend from the center bar 42 at any angle α that is non-parallel with the center bar 42.

As a first example, FIG. 15 shows a first inverse V-shaped spreader device 120. The spreader bar 48 is attached at the front end 46 of the center bar 42; however, there is a fold in the middle of the spreader bar 48 and the side sections 48a, 48b are angled toward the back end 46 of the center bar 42 at an angle α of about 50 degrees. As illustrated in FIG. 15 with the front 46 of the center bar 42 pointing upwards, the spreader device 120 has a spreader bar 48 with inverted V-shape positioned at the top of the center bar 42. In another example illustrated in FIG. 16 the spreader device has a spreader bar 48 with inverted V-shape at the frontward (upper) section 132 of the center bar 42.

Figure 18:
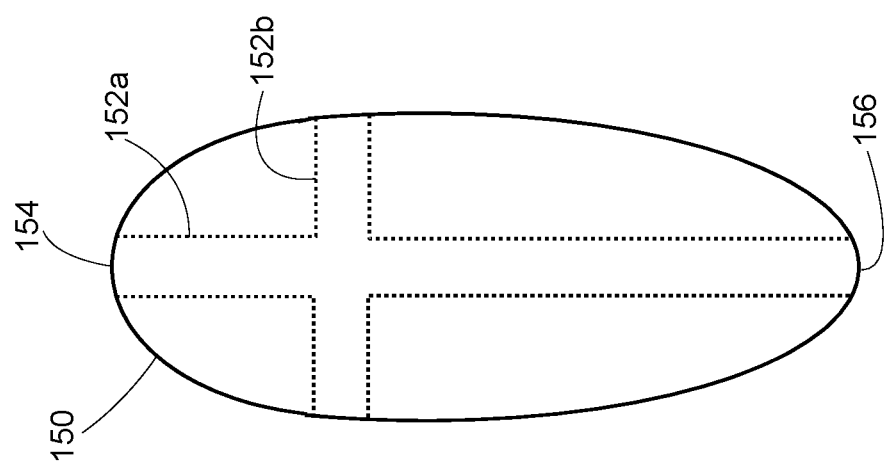
FIG. 18 illustrates a top down view of the connection hub of FIG. 17 illustrating how two holes pass through the body of the connection hub and thereby allow center and spreader bars to be inserted into the connection hub.
Figure 17:
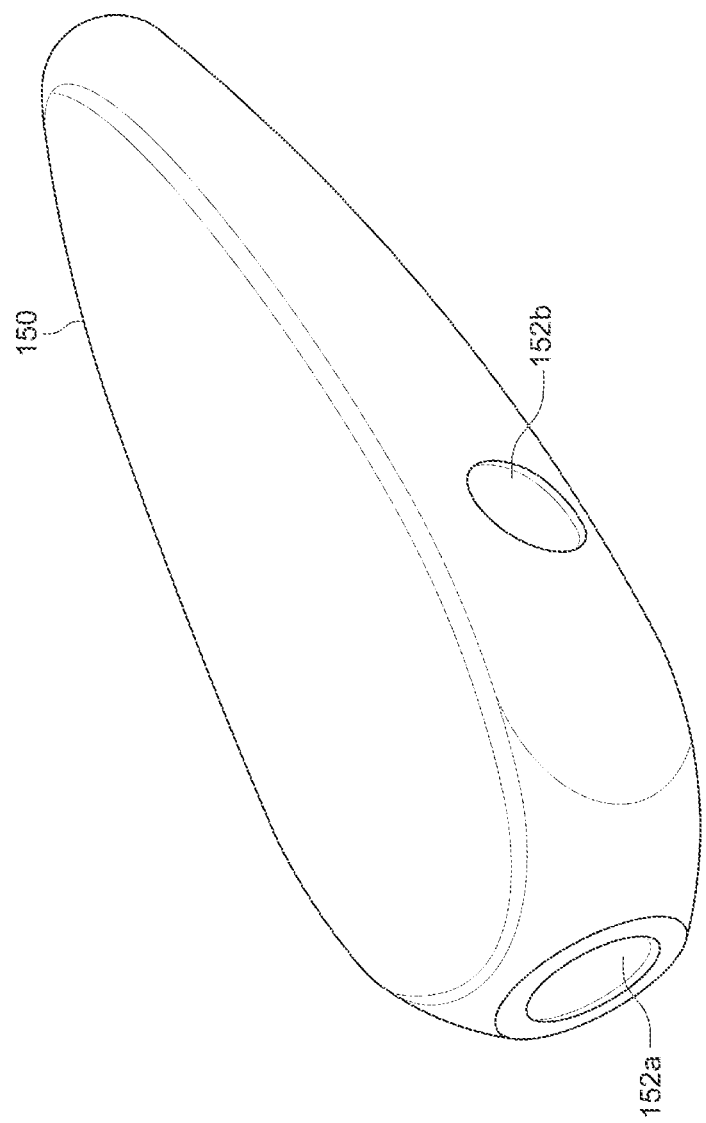
FIG. 17 illustrates a perspective view of a connection hub for attaching spreader bars to the center bar according to an exemplary embodiment.

Other means of attaching spreader bars 48 to the center bar 42 can be used instead of simply welding the bars 42, 48 together. For instance, FIG. 17 illustrates a perspective view of a connection hub 150 for connecting spreader bars 48 to a center bar 42. The connection hub 150 is a block stainless steal having holes 152a,b drilled therethrough as illustrated. FIG. 18 illustrates a top down view of the connection hub 150 of FIG. 17 illustrating how each of the two holes 152a,b pass through the body of the connection hub 150 and thereby allow center and spreader bars 42, 48 to be inserted into the connection hub 150 and thereby attached to one another.

FIG. 19 illustrates a top view of a fish attractant spreader device 160 including the connection hub 150 of FIG. 17 according to an exemplary embodiment. As shown, the spreader device 160 includes the connection hub 150 with a center bar 42 and two spreader bars 48a, 48b inserted and held in place by the connection hub 150 relative to one another. In particular, a first hole 152a running lengthwise from a front end 154 of the connection hub 150 to a back end 156 of the connection hub 150 is utilized to hold the center bar 42. Likewise, a second hole 152b running laterally across the connection hub 150 is utilized to hold first and second spreader bars 48a, 48b.

The bars 42, 48a,b in this embodiment are held within the connection hub 150 by waterproof adhesive; however, any desired attachment means such as mechanical locking pins or other stoppers (see FIG. 22, for example) may also be utilized in other embodiments.

Other differences between the spreader device 160 of FIG. 19 with the early-described embodiments include the way the fish attractants 22 are attached to the spreader bars 48a,b and the way the front and back line attachments 50, 52 are formed on the center bar 42. Concerning the front and back line attachments, in this embodiment, the center bar 42 has a predetermined thickness through which an eyelet hole is drilled near both the front end and the back end of the center bar 42. Split rings or other types of clips such as carabiner-style latches etc. are inserted through the front and back holes to secure the front end to a stacker clip 18 and the rear end to a line release clip 20.

Concerning the fish attractant attachments on either end of the spreader bars 48a,b, rather than utilize eyelets 54 in this embodiment, a ringed notch 162 encircles the cylindrical spreader bar 48a,b near each end. The ringed notch 162 is offset from the true end of each spreader 48a,b bar by an offset distance D.

Figure 20:
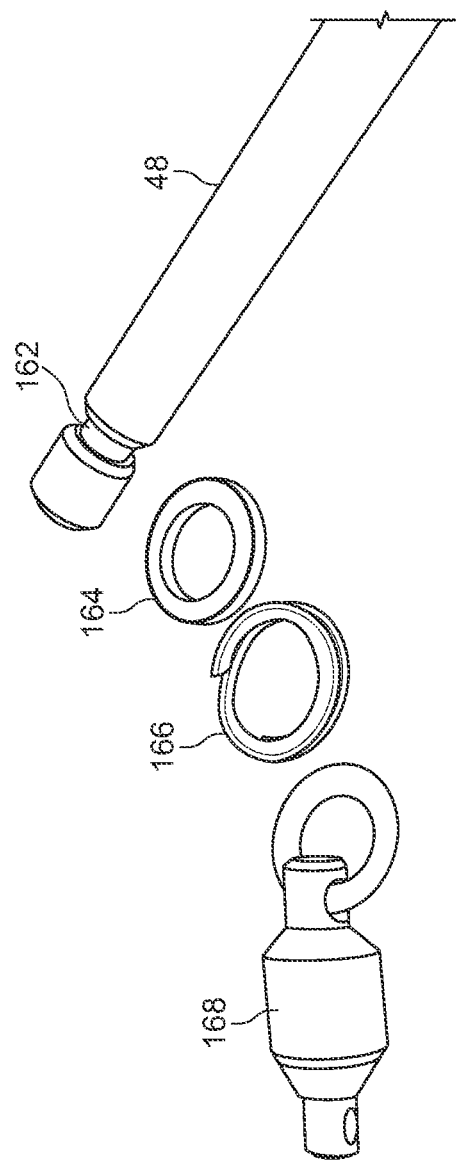
FIG. 20 illustrates an exploded view of fish attractant attachment hardware utilized to secure a fish attractant to the ringed notch on a spreader bar of FIG. 19 according to an exemplary embodiment.

FIG. 20 illustrates an exploded view of the attractant attachment hardware utilized to secure a fish attractant 22 to the ringed notch 162 on a spreader bar 48 according to an exemplary embodiment. In this embodiment, the attractant attachment includes three parts that work together including the ringed notched 162 on the spreader bar 48, a first ring 164, and a second ring 166 being a split ring in this embodiment. Other hardware includes any desired rotating clips 168 or ball bearings etc. as well as the fish attractant itself such as a dodger 22.

Figure 21:
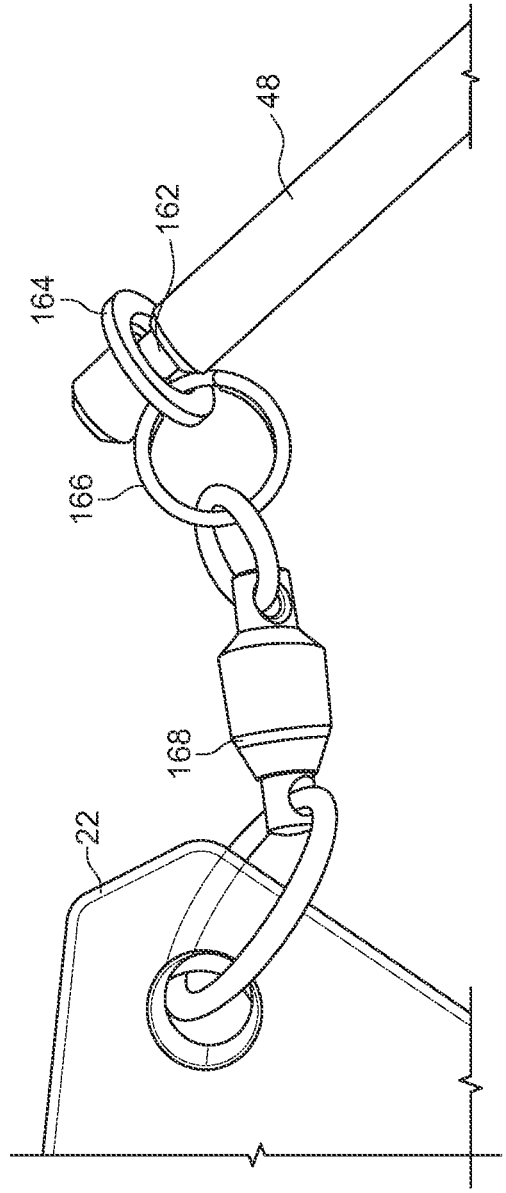
FIG. 21 illustrates how the attractant attachment hardware of FIG. 20 is interconnected to secure a fish attractant to the spreader bar according to an exemplary embodiment.

FIG. 21 illustrates how the attractant attachment hardware of FIG. 20 is interconnected to secure the dodger 22 to the spreader bar 48 according to an exemplary embodiment. As shown, the first ring 164 in this embodiment has an inner diameter that is slightly greater than the outer diameter of the cylindrical spreader bar 48 such that the first ring 164 can be simply slipped onto the end of the spreader bar 48 and placed into the notched area 164. The second ring 166 being a split ring in this embodiment is then fed onto the first ring 164 such that the two rings 164, 166 are interlocked with each other. The thickness of the second ring 166 pulls the first ring 164 such that first ring 164 is held within the notch 162. The attachment of the two rings 164, 166 together in this manner causes the first ring 164 to be held captive within the notch 162. Beneficially, when interlocked in this manner, the first ring and second rings 164, 166 can spin around an axis running lengthwise along the center of the spreader bar 48; however, they cannot be removed from the spreader bar 48.

In comparison with the just utilizing an eyelet 54 on the end of the spreader bar 48, attaching the fish attractant 22 to the spreader bar 48 in the manner illustrated in FIGS. 19-21 is beneficial to prevent the attachment hardware 168 from getting wrapped around the spreader bar 48 and stuck in a weird position that holds the dodger 22 or other fish attractant at a weird angle that prevents the dodger 22 or other fish attractant from moving properly in the water while trolling. The attractant attachment design of FIGS. 19-21 simultaneously secures the dodger 22 to the spreader bar 48 while also allowing free spinning of the dodger 22 around the lengthwise axis of the spreader bar 48.

The attachment mechanism shown in FIGS. 19-21 may also be utilized in other applications to obtain the same benefits. In general, a notch 162 on a cylindrical bar 48 and combination of two rings 164, 166 as illustrated allows an object 22 to be securely attached to the bar 48 while still allowing the object 22 to rotate around a lengthwise axis of the cylindrical bar 48.

Figure 22:
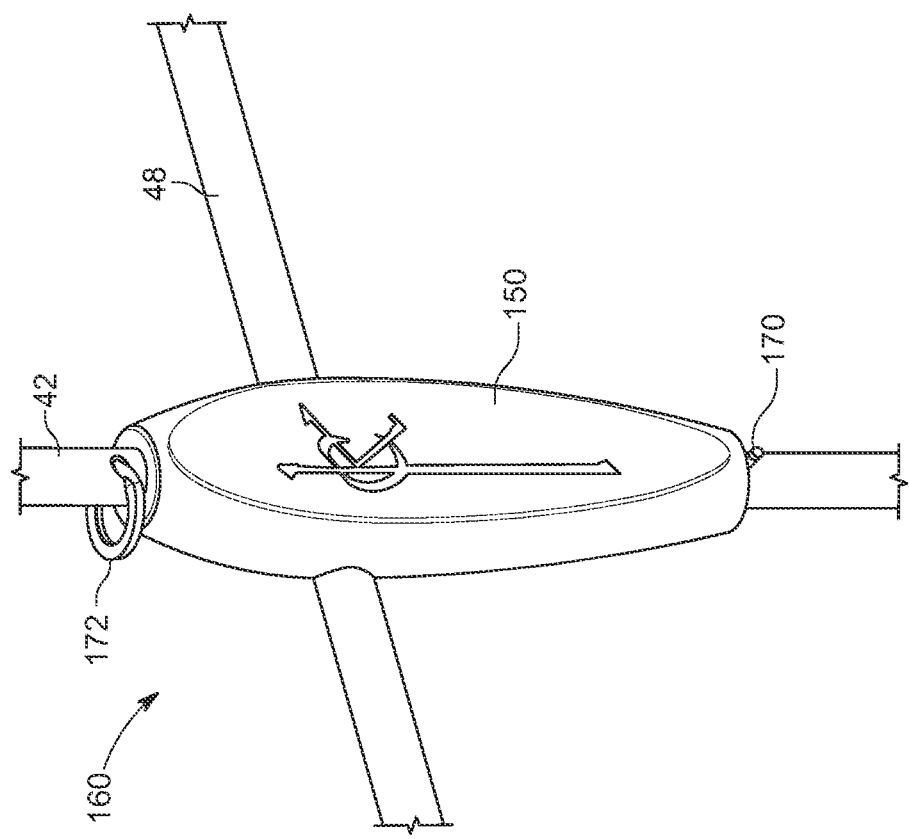
FIG. 22 illustrates a perspective view of a connection hub holding center and spreader bars together with the connection hub being held in position on the center utilizing stoppers according to an exemplary embodiment.

FIG. 22 illustrates a perspective view of a connection hub 150 holding center and spreader bars 42, 48 together with the connection hub 150 being held in position on the center bar 42 utilizing stoppers 170, 172 according to an exemplary embodiment. As illustrated, this embodiment is an alternative way to connect the bars 42, 48 at the hub 150. FIG. 22 shows the center bar 42 held by a pin 170 at the bottom and a removable split ring 172 at the top. This design allows the spreader device 160 to be broken down into separate components for transportation and storage.

A single spreader bar 48 may also be attached to the connection hub 150 in a similar manner. For instance, the spreader bar 48 may be a single bar running behind the center bar 42 and having the same stopper connections 170, 172 (although the drawing of FIG. 22 doesn't show this detail). Essentially, the center bar 42 and the spreader bar 48 may by stacked one on top each other rather than being on a same plane with each other. In this way, the connection hub 150 will have two holes 152a,b running through it that do not intersect with each other in the middle. In this way, each of the center bar 42/spreader bar 48 can simply be inserted through their respective connection hub 150 holes 152a,b and then secured in position utilizing stoppers such as pins 170 and/or split rings 172 through holes that are predrilled in the center bar 42/spreader bar 48.

In preferred embodiments, the spreader bar(s) 48 and/or spreader bar section(s) 48a, 48b are disposed on the center bar 42 at a point of connection 64 closer to the front end 46 of the center bar 42 than to the back end 44 of the center bar 42. This frontward section 132 is shown in FIG. 16 with a curly brace. Locating the connection point 64 within this section 132 helps keep the dodgers 22 or other attractants ahead of the lure 24 to avoid tangling with the fishing line 12 during trolling.

Dodgers 22 typically have a side-to-side swaying action when pulled through the water while trolling. Spreader devices 40, 80, 90, 100, 110, 120, 130, 160 as illustrated are particularly well-suited to dodgers 22 to avoid tangling and for stability of the spreader 40, 80, 90, 100, 110, 120, 130, 160 itself (i.e., the center bar 42 and one or more spreader bars 48) while the spreader 40, 80, 90, 100, 110, 120, 130, 160 is running through the water in the forward direction. However, there are other types of attractants such as flashers, scent cartridges, lights (LEDs), and even sound. All of these attractants may be attached to the spreader device 40, 80, 90, 100, 110, 120, 130, 160 in a similar manner such as via eyelets 54, 114 or other desired attachment mechanisms (e.g., notched ring 162 and cartridges 62). In other words, the spreader devices 40, 80, 90, 100, 110, 120, 130, 160 as illustrated herein are well-suited to spreading out dodgers 22, but are not limited to only dodgers 22, and can be utilized with any desired attractant in a similar manner.

For instance, flashers typically develop full 360° rotations when pulled through the water and they can also be utilized while attached to the spreader device 40, 80, 90, 100, 110, 120, 130, especially when an appropriate number of ball swivels are utilized between the spreader bar 48 end eyelets 54 and the flasher to avoid the flasher from tangling. These ball swivels are well-known in the art and further description is omitted herein for brevity.

In some exemplary embodiments, the spreader device 40, 80, 90, 100, 110, 120, 130, 160 removes flashers and dodgers 22 from the fishing rod line 12. There are a whole host of reasons to do so, however, improving the experience of catching a fish 60 is a main one. The spreader device 40, 80, 90, 100, 110, 120, 130, 160 in some embodiments is a "T" shape or a cross formed by stainless steel (SST) rods. As pictured above in the diagrams of FIG. 2 to FIG. 8 and FIG. 13 to FIG. 14, the device 40, 80, 90, 100, 110, 120, 130 would be travelling from the right (back end) to the left (front end). The clip 18 at the front (far left end) attaches to the downrigger line 16. The fishing line 12, with only a terminal hook 26 attached, clips to the release clip 20 at the back. Dodgers 22 are attached to the two or more remaining ends 56 of the spreader bar(s) 48. In some embodiments, all accessories attach at eyelets 54, 114 using swivels. While trolling, the spreader device 40, 80, 90, 100, 110, 120, 130, 160 will pivot from the front due to tension caused by the fishing line 12 pulling upwards. The dodgers 22 will always remain in the horizontal plane, rotating as the attractant they were designed to be, albeit not integral to the fishing line 12. When a fish 60 strikes and pulls the line 12 out of the release clip 20, the entire spreader device 40, 80, 90, 100, 110, 120, 130 with all its attachments remains connected to the downrigger line 16 and the fisher is left to play only the fish 60, without the drag of an attached flasher and/or dodger 22.

By leaving the spreader device 40, 80, 90, 100, 110, 120, 130, 160 attached to the downrigger ball after fish strike, "Dummy" dodger spreader devices 40, 80, 90, 100, 110, 120, 130, 160 as disclosed herein allow the human fisher to "Play the fish, not the flasher".

Example of advantages experienced by spreader devices according to some embodiments include:

a) No flasher on the fishing line 12.
b) Play the fish, not the flasher.
c) Less releases on decent due to reduced drag on fishing line 12.
d) More accurate release clip 20 control.
e) Easier to retrieve line 12 with kelp because no flasher to catch the weeds.
f) When retrieving, no more wondering if the fish 60 is still on. No flasher drag to confuse.
g) If rod line 12 breaks during retrieval, there is no flasher to lose.
h) Easier to land fish without the flasher in play. Also, able to reel fish 60 closer to boat.
i) Able to put rod directly into rocket launcher for travel, no flasher to remove.
j) Less mess when dealing with the rod after landing a fish 60 (easier to ditch rod).
k) Eliminates problem of flasher on surface when fish 60 breaches, so less likely to lose fish 60.
l) No flasher to tire out the fish 60, that's the fisher's job.
m) Unique, tighter set-up with the CruciFish.
n) Less tangles of lines 12 from each downrigger.
o) Able to turn tighter corners, may be able to circle a bait ball.
p) Easier to stack lines 12.
q) Can build a "Christmas Tree" of dodgers 22, potentially great for sockeye or chum salmon fishing.
r) Tighter dodger 22 rotation allows fishing closer to bottom.
s) Easier to target halibut & bottom fish 60 while trolling.
t) Shorter leaders, or no leaders, for terminal gear will make them easier to store.
u) Quick and easy to set the line 12. Less time to snag surface weeds.
v) Able to use multiple dodgers 22, i.e., more favourites at once.
w) Dodgers 22 can operate over a larger range of trolling speeds than flashers.
x) Can easily add other devices such as scent compartment 62, lights, camera etc.
y) Can add glow tubes to either or both of center bar 42/spreader bar(s) 48.
z) Spreader device 40, 80, 90, 100, 110, 120, 130 can free fall very quickly on deployment without tangling.
aa) Most benefits amplified when fishing deep.
bb) Current research is finding that fish 60 released have a higher mortality rate when caught utilizing an in-line flasher/dodger 22 than when retrieved on a line 12 with only a lure/hook 24, 26. The decrease in drag is less detrimental to the fish 60.
cc) Suitable for both fresh and tidal water fishing.

Although the invention has been described in connection with preferred embodiments, it should be understood that various modifications, additions and alterations may be made to the invention by one skilled in the art without departing from the spirit and scope of the invention.

For example, for additional stability, support can be increased for the spreader device 40, 80, 90, 100, 110, 120, 130, 160 with a second connection to the downrigger line 16. This forms a triangle with wire from spreader front end 46 to downrigger cable 16. The "T"-shape of the spreader bar 48 and the center bar 42 can also be an upper case T or other type of a cross design (lower case t) for example. Other shapes can be utilized such as circle rings or even a corkscrew design. Although above examples have shown the spreader device as a single unit; in some embodiments, a two (or more) piece unit may be utilized. For instance, a user may lock-in the spreader bar 48 then remove and affix when not in use. In this way, in some embodiments, the spreader bar(s) 48 are attached to the center bar 42 in a temporarily manner.

Hinges and/or other adjustable joints may also be utilized to couple the spreader bar arm(s) 48 to the center bar 42. In this way, the spreader bar arm(s) 48, 48a, 48b may fold inward such that the angle α is 0 degrees, i.e., spreader bar(s) 48a, 48b are moveable between a deployed position where the spreader bar(s) 48a, 48b are non-parallel to the center bar 42, and a stowed position where the spreader bar(s) 48a, 48b are parallel with the center bar 42 for easier transport and storage.

A 'wobbly' release clip 20 may be utilized to impart action on the terminal hook 26.

Some parts of the device 40, 80, 90, 100, 110, 120, 130, 150 may be integral to one another and other parts may be separate/discreet. For instance, any combinations of the designs of FIG. 9-12 having any combination of integral/discreet bars 42, 48, connection hub 150, and eyelets 52 may be utilized in different embodiments.

The spreader device 40, 80, 90, 100, 110, 120, 130, 160 may be manufactured from any desired material. Other materials besides stainless steel that may also be utilized include plastic, wood, carbon steel mixes, aluminum, etc.

Although symmetric designs are beneficial for stability, non-symmetrical spreader bar sections 48a, 48b extending from different sides of the center bar 42 at different angles α and/or different distances d may be utilized in other embodiments. In different embodiments, any number of eyelets may be disposed on the spreader bar(s) 48 and/or center bar 42 and/or any other support structures 112 therebetween.

Although the eyelets 50, 52, 54, 114 shown in the above examples are formed by rings, non-ring eyelets may also be utilized in other embodiments. Examples include drilling a bore or other hole through the bar 42, 48 or support structure 112, where the bore hole acts as the eyelet instead of attaching a separate ring component providing the eyelet. Any shaped eyelet that allows attachment of an accessory such as dodger, flasher, other attractant, or lines clips may be utilized.

Figure 23:
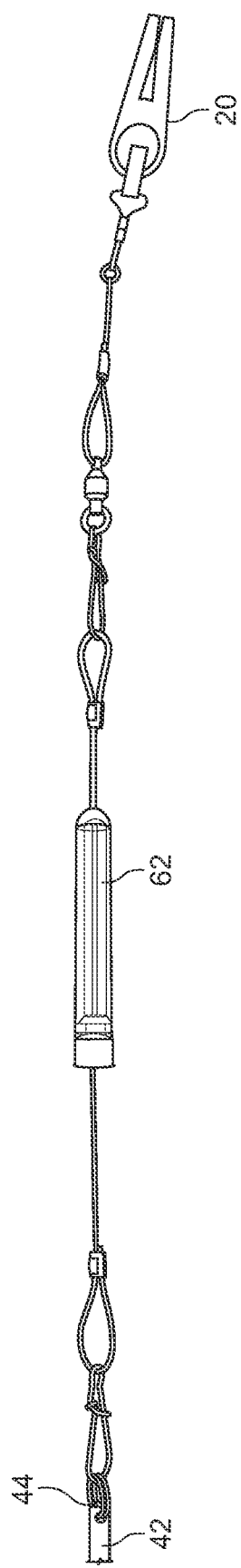
FIG. 23 illustrates a top view of a scent chamber being connected inline between the back end of the center bar and the front end of the lure according to an exemplary embodiment.

In some embodiments, rather than being affixed to the center bar 42, the scent chamber 62 connects in-line and just upstream of the release clip 20. An example of a scent chamber 62 being connected inline between the back end 44 of the center bar 42 and the release clip 20 is shown in FIG. 23, for example.

The steps of the above-described methods are not restricted to the exact order shown and described, and, in other configurations, shown and described steps may be omitted or other intermediate steps added. Functions of single elements may be separated into multiple elements, or the functions of multiple elements may be combined into a single element. All combinations and permutations of the above described features and embodiments may be utilized in conjunction with the invention.

What is claimed is:

1. A fish attractant spreader device comprising:
   a center bar that runs lengthwise from a back end to a front end;
   a spreader bar attached to the center bar and extending lengthwise non-parallel with the center bar from a first end to a second end;
   a front line attachment at the front end of the center bar;
   a downrigger clip connected to the front line attachment of the center bar, the downrigger clip providing for attachment of the fish attractant spreader device to a downrigger line, the downrigger line extending from from a first end at a trolling boat to a second end attached to a downrigger ball;
   a back line attachment at the back end of the center bar;
   a release clip attached to the back line attachment of the center bar, the release clip providing for temporary attachment of the fish attractant spreader device to a fishing line until a force on the fishing line pulls the fishing line out of the release clip, the fishing line extending from a first end at the trolling boat to a second end attached to a lure and a hook; and
   at least one fish attractant attachment on the spreader bar.

2. The fish attractant spreader device of claim 1, further comprising a fish attractant attached to the fish attractant attachment on the spreader bar.

3. The fish attractant spreader device of claim 2, wherein the fish attractant is one of a dodger and a flasher.

4. The fish attractant spreader device of claim 1, wherein the spreader bar is attached to the center bar such that the spreader bar and the center bar are perpendicular to one another.

5. The fish attractant spreader device of claim 4, wherein the spreader bar and the center bar together form a cross shape.

6. The fish attractant spreader device of claim 4, wherein the spreader bar and the center bar together form an uppercase T-shape.

7. The fish attractant spreader device of claim 1, wherein the spreader bar is attached to the center bar such that each of the first end and the second end of the spreader bar are substantially equal distance from the center bar.

8. The fish attractant spreader device of claim 7, further comprising:
   a first fish attractant attachment at the first end of the spreader bar; and
   a second fish attractant attachment at the second end of the spread bar.

9. The fish attractant spreader device of claim 8, further comprising:
   a first fish attractant attached to the first fish attractant attachment of the spreader bar; and
   a second fish attractant attached to the second fish attractant attachment of the spreader bar.

10. The fish attractant spreader device of claim 1, further comprising:
    a plurality of spreader bars attached to the center bar, each of the spreader bars respectively extending lengthwise non-parallel with the center bar from a respective first end to a respective second end; and
    a plurality of spreader bar fish attractant attachments, wherein each of the spreader bars has at least one of the spreader bar fish attractant attachment disposed thereon.

11. The fish attractant spreader device of claim 10, wherein the plurality of spreader bars include at least a first spreader bar and a second spreader bar that are perpendicular to each other.

12. The fish attractant spreader device of claim 11, further comprising a support structure coupling one or more of the spreader bars to one another in addition to the center bar.

13. The fish attractant spreader device of claim 1, wherein each of the front line attachment and the back line attachment are formed by a respective eyelet.

14. The fish attractant spreader device claim 1, wherein the at least one fish attractant attachment on the spreader bar is formed by an eyelet.

15. The fish attractant spreader device of claim 1, wherein:
   the spreader bar is a cylindrical bar; and
   the at least one fish attractant attachment on the spreader bar is formed by a ringed notch that encircles the spreader bar and is offset by a predetermined distance from an end of the spreader bar.

16. The fish attractant spreader device of claim 15, further comprising:
   a fish attractant attached to the ringed notch on the spreader bar utilizing a first ring and a second ring that interlock together;
   wherein the first ring is positioned within the ringed notch and a thickness of the second ring interlocked with the first ring prevents the first ring from leaving the ringed notch.

17. The fish attractant spreader device of claim 1, further comprising:
   a connection hub;
   wherein the connection hub includes a plurality of holes therein having diameter to accept insertion of the center bar and the spreader bar in order to thereby attach the center bar to the spreader bar.

18. The fish attractant spreader device of claim 17, wherein at least one of the center bar and the spreader bar is held in the connection bar utilizing adhesive.

19. A method of utilizing the fish attractant spreader device of claim 1 while trolling, the method comprising:
   connecting a front of the fish attractant spreader device to the downrigger line by attaching the downrigger clip to the downrigger line upstream of the downrigger ball;
   connecting a back of the fish attractant spreader device to the fishing line by attaching the release clip to the fishing line upstream of the lure and the hook;
   pulling the fish attractant spreader device through water by the trolling boat while the fish attractant spreader device is connected to both the downrigger line and the fishing line; and
   after a fish strike force at the hook has exceeded a grip of the release clip and thereby pulled the fishing line out of the release clip, reeling in the fishing line now separated from the fish attractant spreader device.

20. The method of claim 19, further comprising including only the lure and the hook on the fishing line; whereby, drag when reeling in the fishing line after fish strike is reduced because there are no fish attractants in-series with the fishing line between the lure and the trolling boat.

* * * * *